C. LA DOW,
Assignor of one-half to WHEELER AND MELICK COMPANY.
SULKY HARROW.
No. 10,092. Reissued Apr. 25, 1882.
Fig 1
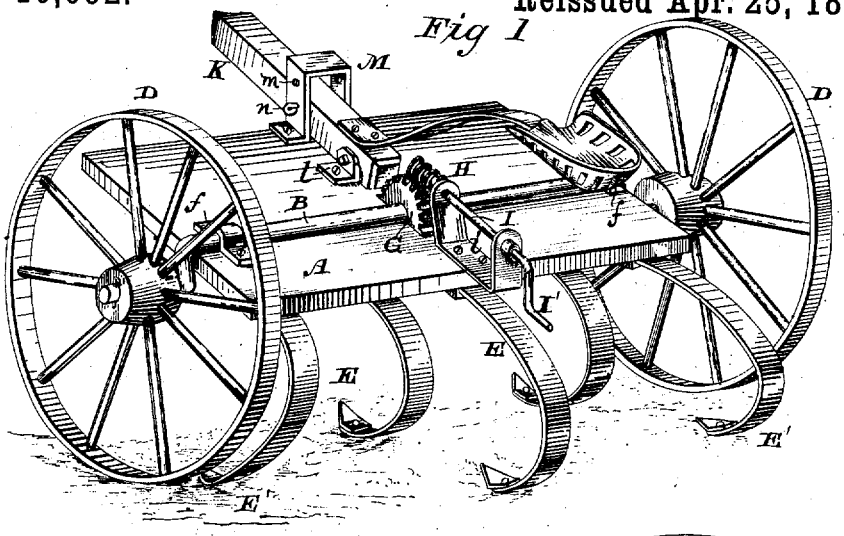
Fig. 2.
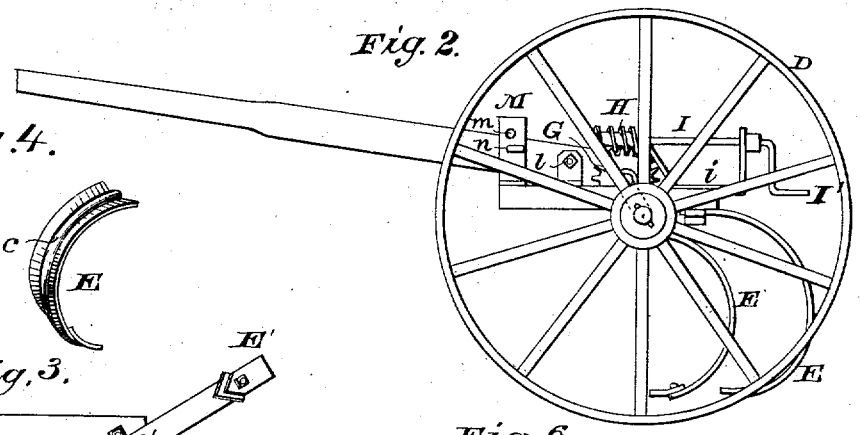
Fig. 4.
Fig. 3.
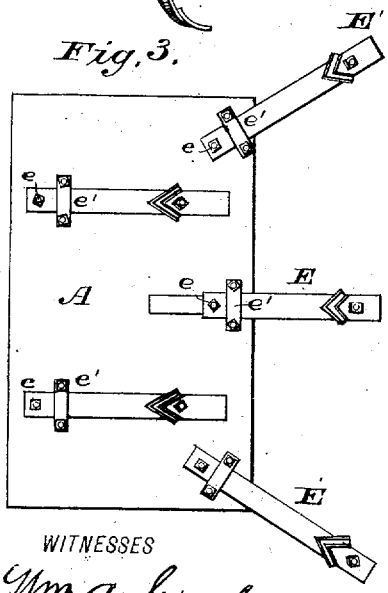
Fig. 6.
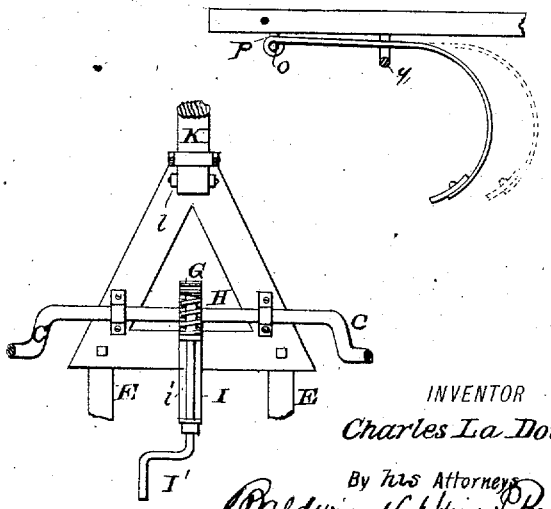
WITNESSES
Wm. A. Skinkle
Wm. J. Tanner
INVENTOR
Charles La Dow
By his Attorneys
Baldwin, Hopkins & Peyton
N. PETERS, Photo-Lithographer, Washington, D. C.

UNITED STATES PATENT OFFICE.

CHARLES LA DOW, OF ALBANY, NEW YORK, ASSIGNOR OF ONE-HALF TO WHEELER & MELICK COMPANY, OF SAME PLACE.

SULKY-HARROW.

SPECIFICATION forming part of Reissued Letters Patent No. 10,092, dated April 25, 1882.

Original No. 222,512, dated December 9, 1879. Application for reissue filed January 4, 1882.

*To all whom it may concern:*

Be it known that I, CHARLES LA DOW, of Albany, in the county of Albany and State of New York, have invented certain new and useful Improvements in Sulky-Harrows, of which the following is a specification.

This invention relates to improvements in that class of sulky-harrows provided with vibratory or spring teeth, and with means for adjusting the same to any desired depth of penetration of the ground. Its objects are to provide for the uniform penetration of the teeth while the implement is at work, and to firmly secure the teeth to the frame and provide a brace against undue bending of the teeth, and to provide a strong, light, and elastic vibratory harrow-tooth.

It consists, first, in arranging the upper curved portions of the rearwardly and downwardly curved vibratory spring-teeth of a harrow directly under rigid portions of the harrow-frame, which forms a continuous bearing for the teeth, so that when the teeth are forced backward by any obstruction they will not be bowed unduly upward, but will be held down to work by said rigid portion of the frame; second, in a curved flat spring harrow-tooth having a longitudinal rib formed on its surface, whereby the tooth is given a proper amount of strength, and is enabled to be made comparatively light.

In the accompanying drawings, Figure 1 is a rear perspective view of my improved sulky-harrow. Fig. 2 is a side elevation of the same. Fig. 3 is a bottom view of the rigid frame of the same. Fig. 4 is a detached perspective and cross-sectional view of one of my improved harrow-teeth. Fig. 5 is a top view of a modification of the harrow. Fig. 6 illustrates a modification of the mode of attaching the teeth to the frame.

The letter A designates the rigid platform or frame of the harrow, which is mounted on the axle B, having at its ends the cranks C, upon which are mounted the wheels D.

To the lower surface of the rigid platform or frame is secured the upper ends of the rearwardly and downwardly curved vibratory spring-teeth E, which, by reason of their shape and elasticity, are adapted to each yield to inequalities and obstructions without disturbing the others and without causing the harrow to jump from the ground or skip any portion of the area traversed. The upper portion of each of these teeth is secured to the rigid platform at two points, *e e'*, one, *e*, being directly at the upper end, and the other, *e'*, at a point some distance from the end, so that each tooth is thus well braced against sidewise strain, which might otherwise throw it out of its proper position.

It will also be observed that the upper portion of each tooth is attached directly under a solid rigid portion of the platform, which, when the tooth is caused to yield rearwardly by inequalities or obstructions, prevents it from being unduly bowed upward and holds it down well to work.

The axle B is secured to the platform or frame by metal straps *f*, and its cranks project beyond the end of said frame, while at about its middle the axle has securely fixed upon it a worm-wheel, G, which meshes with a worm, H, carried by a rotary shaft, I, mounted in a bracket, *i*, and provided with a crank, I', by which it may be turned.

By turning the crank and the shaft and worm in either direction it is obvious that the worm-wheel and axle B will be caused to turn in a corresponding direction, and the cranks may thus be caused to project upward or downward, rearward or forward, or at any angle to the frame which will give said frame an elevation to cause the desired depth of penetration of the teeth.

The throwing of the cranks forward or rearward is for the purpose of balancing the implement to suit the weight of the driver. As the seat J extends to the rearward of the wheel-spindle, it will be seen that when a driver of light weight is upon the implement the spindles which form the fulcrum of the harrow should be relatively farther forward than were a heavier person driving, in order that the light driver shall have a greater length of leverage in his favor to enable his weight to effect a proper balance of the machine. The cranks are of such length that when they are adjusted directly downward the platform will be elevated to such a height as to raise the teeth clear of the ground and enable the implement to be moved from field to field and upon the road without hauling it in a wagon.

It will be further observed that the worm and worm-wheel serve to hold the axle and cranks in whatever position they are adjusted without the aid of any other stop or clutch.

The pole K is pivoted to ears *l*, fixed upon the frame A, and extends forward through a loop, M, the sides or legs of which are provided with a series of perforations, *m*. The pole is provided with a through-hole which, by raising or lowering said pole, may be brought into coincidence with any of the opposite perforations of the loop, and if then a pin, *n*, be passed through the coincident perforations of the loop and the hole in the pole, it will be seen that the pole may be adjusted and secured at any desired angle to the platform or frame. The purpose of this adjustment of the pole is to secure an equal penetration of all the harrow-teeth, when the harrow is in use, at whatever height the platform or frame may be set; for, were the pole rigidly attached, it is evident that when the frame is lowered the front side will be at a relatively greater height than before, and vice versa, so that every change of adjustment of the height of the frame would vary and render unequal the penetration of front and rear rows of teeth; but by adjusting the angle of the tongue to correspond with the adjustment of the frame said frame may be maintained in a practically horizontal position, and all the teeth given an equal penetration.

The rear side teeth, E′, of the harrow are inclined outwardly, so that their points will penetrate the ground almost directly in rear of the wheels, so that the furrows made by these teeth will force the earth into the tracks of the wheels, thereby obliterating said tracks as the implement proceeds.

In Fig. 4 is shown a detached perspective view of my improved vibratory harrow-tooth. In order that I may use a minimum amount of stock in the tooth, I form upon the rear surface of the same a longitudinal rib, *c*, which gives the body of the tooth a proper amount of strength for all practical purposes and re-enforces its resilience, so that it shall have in the highest degree that vibratory character which is so conducive to its efficient action. Each of the teeth I provide with a double-pointed approximately lozenge-shaped reversible point secured to the lower end of the tooth-body. By loosening the bolt *c′* the tooth may be adjusted with either end in working position, as desired, so that when one end becomes dull the other may be used, and frequent stoppage for sharpening is thus avoided. It is, however, not essential that reversible or any other separate points be used; nor will it be necessary to resharpen the teeth after once being formed pointed, as the edges will, of course, wear away more rapidly than the central rib, and the tooth is thus kept pointed and sharp by wear.

Fig. 5 illustrates simply a modification of the form of the harrow-frame, which will be readily understood, an A-shaped or triangular frame being used instead of the rectangular form shown in Figs. 1 and 2.

In the modification of the mode of attaching the teeth to the frame, as shown in Fig. 6, the extreme upper end of the tooth is bent to form a bearing, *o*, which embraces the lower bar, *p*, of a loop, which thus forms a pivot for the tooth to swing upon. A short distance in rear of this pivot-loop is a longer loop, *q*, which hangs downward and embraces the edges of the tooth so closely as to prevent sidewise play, but to permit vertical play. This mode of attachment is particularly useful in rough ground, as it permits the teeth to fall varying distances, and thus take behind large clods and into depressions. The action of the teeth otherwise is essentially the same as in Figs. 1 and 2.

I am aware that machines have been made with more than one gang of round spring-teeth mounted on wheels, as shown in the hay-rake patents to Geo. N. Palmer, dated respectively December 12, 1865, and May 28, 1867; also, that others have been made with gangs of flat spring-teeth, as shown in patent to D. L. Garver, October 5, 1869; also, that hay-rakes have been made with one gang of flat spring-teeth hinged to an axle, as shown in patent to H. Sabin, December 3, 1850; also, that grain-drills have been made having teeth hinged to the frame with their points in different vertical planes, said teeth being rigid in themselves or rendered somewhat elastic by auxiliary springs; and I do not claim such devices, nor anything that is the mere equivalent thereof; but this organization comprehends spring, teeth so formed that they may yield rearwardly, but avoid undue side vibration or clashing with each other, and arranged on the frame in such manner that the ground may be thoroughly broken at one transit of the machine, and at the same time allow obstructions to readily pass through between the teeth, and to combine said arrangement of teeth with carrying-wheels and gaging mechanism, that said teeth may be raised or lowered and set at different angles of inclination, all the parts coacting for the purpose of accomplishing the result herein specified.

What I claim is—

1. In a harrow, the combination of a pole, wheels, and frame with flat spring-teeth mounted on the frame and adapted to dig the ground, said teeth being arranged in two or more rows or ranks transversely to the path of the machine.

2. In a sulky-harrow, the combination of a frame vertically adjustable on wheels and armed with spring-teeth, the inclination of which can be varied, the two adjustments being independent of each other, whereby the frame can be raised and lowered and the angle of inclination of the harrow-teeth can be varied.

3. In a sulky-harrow, the combination of wheels, frame, spring-teeth arranged in rows or ranks across the path of the machine, each row acting simultaneously on the soil, and mechanism for setting and holding all the teeth at different angles of inclination relatively to the draft-pole.

4. In a sulky-harrow, the combination of wheels, frame, spring-teeth in rows or ranks across the path of the machine, each row acting simultaneously on the soil, and mechanism for changing the position and holding the rows of teeth, as adjusted relatively to the supporting-wheels.

5. A draft-frame and vibratory teeth attached thereto, acting on the soil in different planes across the path of the machine, and capable of conforming to the inequalities of the surface traversed, in combination with wheels or equivalent supports for maintaining the frame a suitable distance above the ground.

6. A flat spring harrow-tooth having an eye-bearing formed out of the tooth itself to act as a hinge for said tooth, substantially as described.

7. The combination, with the rigid harrow-frame, of the rearwardly and downwardly curved vibratory spring-teeth, having the upper portions of these curves secured directly under rigid solid portions of the harrow-frame, which forms a continuous bearing for the teeth, so that when the teeth are forced backward by any obstruction they will not be bowed unduly upward, but will be held down to work by said rigid portions of the frame, essentially as set forth.

8. A curved flat spring harrow-tooth having a longitudinal rib formed on its surface, whereby the tooth is re-enforced and given a proper amount of strength, and is enabled to be made comparatively light, essentially as shown, and for the purpose set forth.

In testimony whereof I have hereunto subscribed my name this 31st day of December, 1881.

CHAS. LA DOW.

Witnesses:
WM. W. DIAMOND,
N. E. DE GROAT.